(12) United States Patent
Desdier et al.

(10) Patent No.: US 10,237,122 B2
(45) Date of Patent: Mar. 19, 2019

(54) METHODS, SYSTEMS, AND COMPUTER READABLE MEDIA FOR PROVIDING HIGH AVAILABILITY SUPPORT AT A BYPASS SWITCH

(71) Applicant: Ixia, Calabasas, CA (US)

(72) Inventors: Marcel Felix Desdier, Pleasanton, CA (US); Wenxing Quan, Fremont, CA (US); Elaine Rhodes, Felton, CA (US); Ophir Shmuel Artzi, Sunnyvale, CA (US)

(73) Assignee: KEYSIGHT TECHNOLOGIES SINGAPORE (HOLDINGS) PTE. LTD., Singapore (SG)

( * ) Notice: Subject to any disclaimer, the term of this patent is extended or adjusted under 35 U.S.C. 154(b) by 78 days.

(21) Appl. No.: 15/169,702

(22) Filed: May 31, 2016

(65) Prior Publication Data

US 2017/0346678 A1    Nov. 30, 2017

(51) Int. Cl.
*H04L 12/24*     (2006.01)
*H04L 12/26*     (2006.01)

(52) U.S. Cl.
CPC ...... *H04L 41/0663* (2013.01); *H04L 43/0805* (2013.01)

(58) Field of Classification Search
CPC ....... G07C 5/0808; G08B 25/016; G08G 1/20
See application file for complete search history.

(56) References Cited

U.S. PATENT DOCUMENTS

| | | | | |
|---|---|---|---|---|
| 2007/0121486 A1* | 5/2007 | Guichard | ................ | H04L 45/02 370/216 |
| 2008/0034072 A1* | 2/2008 | He | ...................... | H04L 41/5009 709/223 |
| 2010/0124196 A1* | 5/2010 | Bonar | .................. | H04B 7/0689 370/329 |
| 2016/0173323 A1* | 6/2016 | Scholl | ................ | H04L 41/0654 370/221 |
| 2017/0223097 A1* | 8/2017 | Zhang | ................. | H04L 67/1008 |
| 2017/0317899 A1* | 11/2017 | Taylor | ................... | H04L 43/062 |

OTHER PUBLICATIONS

"External Bypass Switches—A Better Inline Security Solution," Heartbeat for Every Networking Tool, 915-6686-01 Rev. B., Ixia White Paper, pp. 1-5 (Dec. 2015).

* cited by examiner

*Primary Examiner* — Raj Jain
*Assistant Examiner* — Harry H Kim

(57) ABSTRACT

Methods, systems, and computer readable media for providing high availability support at a bypass switch are disclosed. One method occurs at a bypass switch. The method includes determining that an inline tool associated with a bypass switch is unavailable. The method also includes determining whether the inline tool is required or optional. The method further includes in response to determining that the inline tool is required, disabling at least one link associated with the bypass switch so as to trigger a switchover involving a second bypass switch.

11 Claims, 5 Drawing Sheets

| TOOL ID | REQUIRED? | ACTION WHEN UNAVAILABLE |
|---|---|---|
| TOOL 1 | YES | DISABLE LINK(S)/ TRIGGER SWITCHOVER |
| TOOL 2 | NO | ACTIVATE BYPASS MODE |
| TOOL 3 | NO | ACTIVATE BYPASS MODE |

METHODS, SYSTEMS, AND COMPUTER READABLE MEDIA FOR PROVIDING HIGH AVAILABILITY SUPPORT AT A BYPASS SWITCH

TECHNICAL FIELD

The subject matter described herein generally relates to providing high availability support at a bypass switch.

BACKGROUND

Communications networks are delivering more services and carrying greater amounts of multi-protocol traffic at higher data rates. Increased security threats and tighter regulatory compliance requirements can further complicate network operations. Monitoring tools and security tools can be deployed inline to inspect packets and block incoming threats before these threats affect the network and potentially disrupt business.

Deployment of any inline tool in the network carries the risk of the tool becoming a point of failure. Should the inline tool become unavailable it can bring the network link down, making a critical segment of the network unavailable and affecting uptime. To avoid this risk, a bypass switch can sit in front of an inline security or monitoring tool to guarantee network availability. A bypass switch can serve as a bridge between the network and the inline tool. It lets the inline tool inspect and control network traffic as needed while protecting the network from failures within the tool itself by automatically shunting (e.g., bypassing) traffic around the tool when the tool is incapable of passing traffic.

SUMMARY

Methods, systems, and computer readable media for providing high availability support at a bypass switch are disclosed. One method occurs at a bypass switch. The method includes determining that an inline tool associated with a bypass switch is unavailable. The method also includes determining whether the inline tool is required or optional. The method further includes in response to determining that the inline tool is required, disabling at least one link associated with the bypass switch so as to trigger a switchover involving a second bypass switch.

One system includes a bypass switch including a memory, computing hardware, and a tool availability module (TAM). The TAM is implemented using the computing hardware and the memory. The TAM is for providing high availability support at the bypass switch. Providing high availability support at the bypass switch includes determining that an inline tool associated with a bypass switch is unavailable, determining whether the inline tool is required or optional, and in response to determining that the inline tool is required, disabling at least one link associated with the bypass switch so as to trigger a switchover involving a second bypass switch.

The subject matter described herein may be implemented in software in combination with hardware and/or firmware. For example, the subject matter described herein may be implemented in software executed by a processor. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory devices, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

As used herein, the term "node" refers to a physical computing platform including at least one processor and memory.

As used herein, the terms "function" or "module" refer to hardware, firmware, or software in combination with hardware and/or firmware for implementing features described herein.

BRIEF DESCRIPTION OF THE DRAWINGS

The subject matter described herein will now be explained with reference to the accompanying drawings of which:

FIG. 2 is a diagram illustrating example data associated with providing high availability support at a bypass switch;

DETAILED DESCRIPTION

The subject matter described herein relates to methods, systems, and computer readable media for providing high availability support at a bypass switch. In some deployments, a bypass switch is placed inline with a link that is carrying network traffic. In such deployments, network traffic received at an ingress port of the bypass switch is directed to one or more tools (e.g., an intrusion detection node, a security device, a metering device, etc.) connected to egress ports of the bypass switch. In the event that a connected tool becomes unavailable (e.g., does not respond to a heartbeat request message), the bypass switch may activate a bypass mode, whereby network packets are immediately returned to the network via an egress port without being sent to the connected tool(s). While activating a bypass mode to shunt traffic around unavailable tools may be useful in some scenarios, other scenarios may benefit from a bypass switch performing or initiating other actions depending on which tool or what type of network is unavailable In accordance with some aspects of the subject matter described herein, equipment, techniques, methods, or mechanisms are disclosed for providing high availability support at a bypass switch. For example, a computing platform (e.g., a testing platform, a device, or a node) or a module (e.g., a field-programmable gateway array (FPGA), an application-specific integrated circuit (ASIC), and/or software executing on a processor) may be configured to provide high availability support at a bypass switch. In some embodiments, a bypass switch in accordance with one or more aspects described herein may respond to the unavailability of a tool with various actions depending on whether the tool or a related port is deemed required (e.g., critical to a network) or optional (e.g., non-critical to a network). For example, if an optional tool becomes unavailable, a bypass switch in accordance with one or more aspects described herein may activate a bypass mode and may shunt network traffic around the unavailable tool. In another example, if a required tool becomes unavailable, instead of activating a bypass mode for all tools, a bypass switch in accordance with one or more aspects described herein may initiate or cause one or more of network ingress and/or egress ports at the bypass switch to fail or be taken out of service. In this example, disabling one or more of network ingress and/or egress ports at the bypass switch may trigger a switchover (e.g., a failover) such that a different (e.g., redundant) bypass switch is able to provide access to the required tool or a tool with similar functionality.

Reference will now be made in detail to various embodiments of the subject matter described herein, examples of which are illustrated in the accompanying drawings. Wherever possible, the same reference numbers will be used throughout the drawings to refer to the same or like parts.

Figure 1:
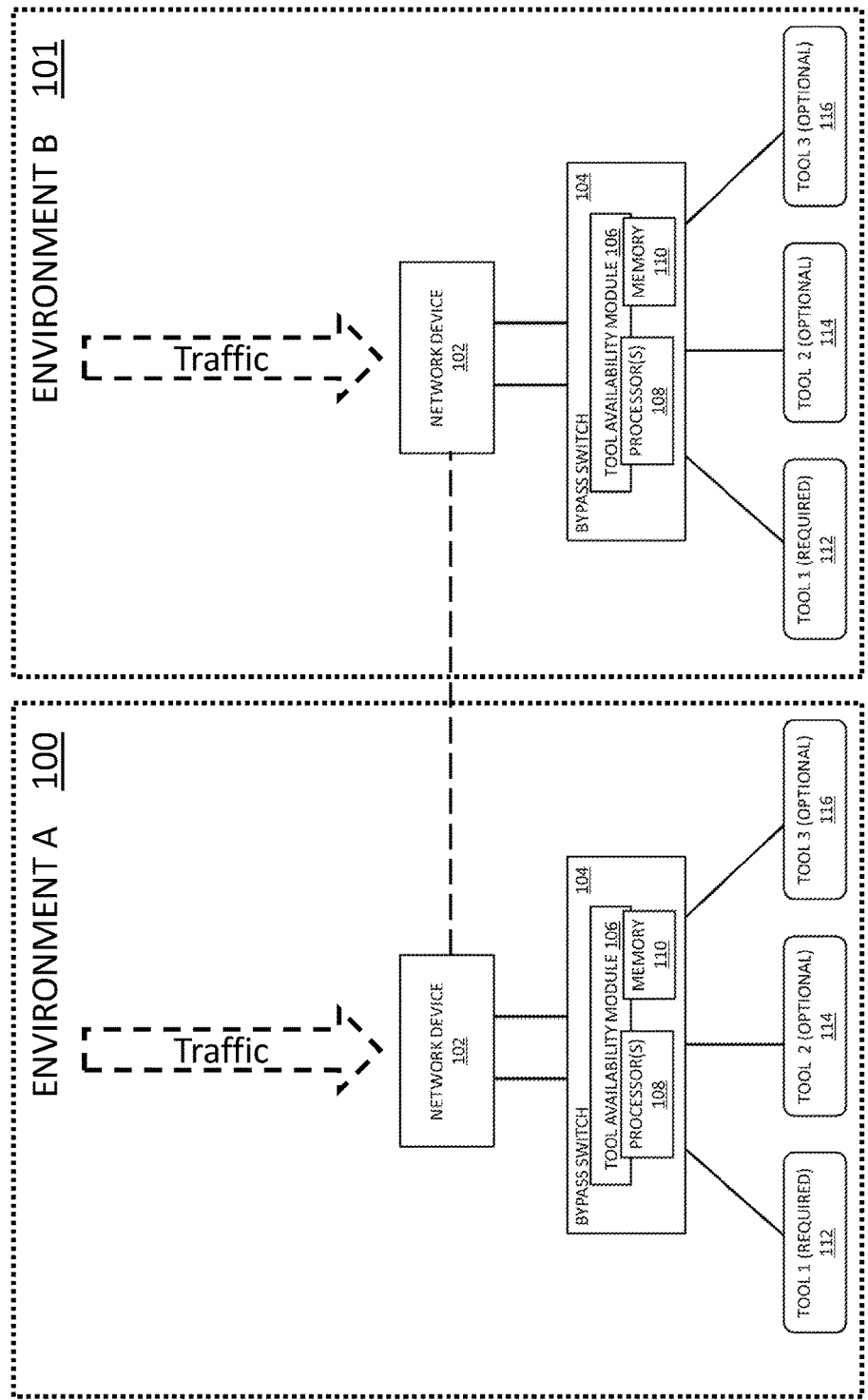
FIG. 1 is a block diagram illustrating an example active-active environment with bypass switches providing high availability support.

FIG. 1 is a block diagram illustrating an example active-active environment with bypass switches providing high availability support. As depicted in FIG. 1, each of environments 100 and 101 may represent a network including one or more nodes, devices, and/or tools for performing various functions. For example, each of environments 100 and 101 may include a network device 102, a bypass switch 104, and tools 112-116. In some embodiments, e.g., in an active-active environment or configuration, each of environments 100 and 101 may be active and may receive, send, and/or process a portion of network traffic using its own bypass switch 104 and associated tools 112-116.

In some embodiments, e.g., in an active-standby environment or configuration, environment 100 may be active, while environment 101 may be inactive and/or in standby mode or environment 101 may be active, while environment 100 may be inactive and/or in standby mode. For example, an active environment may analyze network traffic using its own bypass switch 104 and associated tools 112-116 and a standby environment may be utilized if and/or when the active network experiences issues and/or is inactive (e.g., a switchover occurs).

Network device 102 may represent any suitable entity or entities (e.g., one or more testing platforms, nodes, or devices) associated with sending or receiving network traffic (e.g., one or more messages or other data units). For example, network device 102 may represent a network switch, a router, repeaters, proxies, etc. in a network or portion thereof. In this example, network device 102 may receive network traffic from one or more entities (e.g., other network devices, servers, routers, switches, repeaters, proxies, etc.) and may be connected to tools 112-116 via bypass switch 104.

Bypass switch 104 may represent any suitable entity or entities (e.g., one or more computing platforms, nodes, or devices) associated with sending or receiving network traffic (e.g., one or more messages or other data units) from one or more tools 112-116. For example, bypass switch 104 may represent a hardware device configured to switch or send network traffic between network device 102 and tools 112-116.

In some embodiments, bypass switch 104 may include one or more communications interfaces and/or related ports for communicating with network device 102, tools 112-116, and/or other entitles. For example, each port may include RJ45 connectors, optic network connectors, or other appropriate connectors for communicating with various network nodes. In some embodiments, bypass switch 104 may include dedicated management ports for communicating with network operators and/or management systems.

In some embodiments, bypass switch 104 may include a switching circuit for switching network traffic between the ports. The switching circuit may be implemented in one or more integrated circuits or any appropriate combination of hardware and software. For example, the switching circuit may be implemented in a FPGA or an ASIC, and the switching circuit configuration may be specified using circuit diagrams and/or code written in a hardware description language (HDL).

Bypass switch 104 may include one or more processor(s) 108, memory 110, and a tool availability module (TAM) 106. Processor(s) 108 may represent or include a physical processor, a general purpose microprocessor, a single-core processor, a multi-core processor, an FPGA, and/or an ASIC. Memory 110 may represent one or more computer readable media for storing data, logic, or other information. In some embodiments, memory 110 may be located at bypass switch 104, another node, or distributed across multiple platforms or devices.

In some embodiments, processor(s) 108 may be configured to execute software stored in one or more non-transitory computer readable media. For example, software may be loaded into the memory 110 or into a different memory structure for execution by the processor(s) 108. In some embodiments, e.g., where bypass switch 104 includes multiple processors, some processor(s) 108 may be configured to operate independently of other processor(s) 108.

In some embodiments, processor(s) 108 may be configured to execute remote management security. For example, remote management security may be provided through one or more of role based user access (RBAC), secure socket layer (SSL) encryption, hypertext transfer protocol on SSL (HTTPS), simple network management protocol (SNMP), secure shell (SSH), and an Internet protocol (IP) address access list. Processor(s) 108 may be configured to disable access to management interfaces as appropriate to prevent unwanted access to those interfaces.

TAM 106 may be any suitable entity or entities (e.g., software executing on a processor, an ASIC, an FPGA, or a combination of software, an ASIC, or an FPGA) for performing one or more aspects associated with providing high availability support at bypass switch 104. For example, TAM 106 may determine whether one of tools 112-116 is unavailable and, in response, may determine various actions to perform so as to prevent or minimize network issues or network performance degradation.

In some embodiments, TAM 106 may be implemented using processor(s) 108 and/or memory 110. For example, TAM 106 may utilize processor(s) 108 (e.g., using software stored in memory 110) to monitor or detect when links, tools 112-116, or ports are unavailable or experiencing issues. In this example, TAM 106 may also utilize processor(s) 108 to perform various actions such that little to no downtime is experienced when one of tools 112-116 is unavailable.

In some embodiments, TAM 106 may include or utilize one or more communications interfaces, e.g., one or more network interface cards (NICs), for interacting with users, modules, and/or nodes. For example, TAM 106 may use one or more communications interfaces for receiving and sending various types of data units; such as IP messages, Ethernet frames, Ethernet messages, packet data units (PDUs), datagrams, user datagram protocol (UDP) messages, transmission control protocol (TCP) messages, IP version 4 (v4) messages, IP version 6 (v6) messages, stream control transmission protocol (SCTP) messages, real-time transport protocol (RTP) messages, or reliable data protocol (RDP) messages, messages using a tunneling protocol, and/or other data units.

In some embodiments, TAM 106 may include functionality for accessing memory 110. Memory 110 may contain switching information usable for switching network traffic to or from tools 112-116. Memory 110 may also include port status or link status information (e.g., health information) for indicating whether a port or link is normal (e.g., active), congested, or unavailable (e.g., inactive). Memory 110 may also include data indicating whether a particular tool is required or optional and/or may indicate which actions to initiate or perform when a particular tool becomes unavailable. Example data usable by bypass switch 104 and/or TAM 106 is further discussed below with regard to FIG. 2.

Each of tools 112-116 may represent any suitable entity or entities (e.g., one or more computing platforms, modules, software executing on hardware, nodes, or devices) associated with receiving, processing, inspecting, analyzing, and/or controlling network traffic. For example, each of tools 112-116 may represent an inline tool, such as a system configured to inspect and/or control network traffic, e.g., for security, monitoring, or both. In this example, each of tools 112-116 may represent a metering device, a monitoring device, a billing system, a security device, an intrusion prevention system (IPS) device, a firewall, a wireless area network (WAN) optimization device, or a unified threat management system.

Bypass switch 104 and/or TAM 106 may include functionality for minimizing failures and/or other issues when one or more of tools 112-116 are unavailable. For example, bypass switch 104 may be located between network device 102 and tools 112-116 and may be configure to react in various ways for avoiding network failure if one of tools 112-116 fail, e.g., by losing power or having a software crash.

In some embodiments, TAM 106 may include functionality for determining when or whether one or more of tools 112-116 or related links or ports become unavailable. For example, TAM 106 may use any appropriate network diagnostic technique, e.g., by sending periodic heartbeat messages on the ports, for determining whether tools 112-116 are reachable. If TAM 106 does not receive an appropriate response from a heartbeat message on a particular port (e.g., within a particular amount of time), then TAM 106 may determine that a system connected to that particular port has failed or unavailable.

In some embodiments, after determining a tool is unavailable, TAM 106 may determine whether the tool is required or optional. For example, TAM 106 may access or query memory 110 or a data structure associated with bypass switch 104 for obtaining information about how to handle the unavailability of a particular tool. In this example, depending on whether a tool is required (e.g., mandatory or critical to a network or network operator) or optional (e.g., non-critical to a network or network operator), bypass switch 104 and/or TAM 106 may perform or initiate different actions.

For example, in response to determining that tool 112 is required, TAM 106 may disable at least one link or port associated with bypass switch 104 and/or may trigger a switchover involving a different bypass switch 104. For example, TAM 106 may disable an egress port and/or an ingress port connecting network device 102 and bypass switch 104. In this example, network device 102 or another entity may detect that a link or port is disabled or that bypass switch 104 is unavailable and may trigger a switchover. Continuing with this example, after a switchover, a different bypass switch 104 may receive network traffic.

In another example, in response to determining that tool 114 is optional, TAM 106 may activate a bypass mode at bypass switch 104 such that network traffic is shunted around tool 114. In this example, bypass switch 104 may bypass or shunt around an unavailable tool by sending network traffic directly from an ingress network port at bypass switch 104 to an egress network port at bypass switch 104.

It will be appreciated that FIG. 1 is for illustrative purposes and that various nodes and/or modules, locations, and/or functionality described above in relation to FIG. 1 may be changed, altered, added, or removed.

FIG. 2 is a diagram illustrating example data 200 associated with providing high availability support at a bypass switch. In some embodiments, data 200 may be accessed, utilized, and/or stored by bypass switch 104 and/or TAM 106. In some embodiments, data 200 may include any suitable information, such as tool identifiers (IDs), optionality indicators, and/or action information, usable for providing high availability support at a bypass switch. In some embodiments, data 200 may be stored using various data structures in memory 110 and may be usable for determining how bypass switch 104 responds to a tool becoming unavailable.

Referring to FIG. 2, data 200 may be depicted using a table representing associations between tool IDs for indicating particular tools, optionality indicators for indicating whether particular tools are required or optional, and/or action information for indicating actions to perform in response to particular tools becoming unavailable. For example, a table representing data 200 may comprise columns and/or fields for tool IDs, optionality indicators, and/or action information.

A 'Tool ID' field value may comprise a value, a name, and/or a related identifier for identifying or indicating a particular tool (e.g., a metering device or an IPS device). For example, a tool ID may include a name and/or a value, e.g., 'tool 1', 'tool 2', and 'tool 3'. In another example, a tool ID may be based on a network address and/or a device identifier, such as an Internet protocol (IP) address and/or a media access control (MAC) address.

In some embodiments, tool IDs may be used as keys or index values into a data structure for storing data 200. For example, when TAM 106 fails to detect a heartbeat response message from tool 114, TAM 106 may use a tool ID (e.g., 'tool 2') associated with tool 114 to determine whether tool 114 is required or optional and/or a related action for bypass switch 104 to perform when tool 114 is unavailable.

A 'Required?' field value may comprise a Boolean value, a binary value, a 'Yes' or 'No' value, or other information for indicating whether a particular tool is required or optional. For example, a 'Required?' field value may indicate 'Yes" if a particular tool is required (e.g., critical or mandatory). In another example, a 'Required?' field value may indicate 'No" if a particular tool is not required (e.g., non-critical or optional).

An 'Action When Unavailable' field value may comprise a value, a name, code, logic, text, and/or other information for indicating one or more actions performed by or initiated by bypass switch 104 and/or TAM 106. For example, an 'Action When Unavailable' field value may indicate that when a particular tool is determined to be unavailable (e.g., unreachable) that one or more links or ports are to be disabled and/or a switchover (e.g., to another bypass switch and/or tool) is to be triggered. In another example, an 'Action When Unavailable' field value may indicate that when a particular tool is determined to be unavailable (e.g., unreachable) that bypass switch 104 is to activate a bypass mode.

It will be appreciated that data 200 in FIG. 2 is for illustrative purposes and that different and/or additional information may also be stored or maintained. For example, memory 110 may store tool IDs and action information without storing separate or distinct optionality indicators. Further, it will be appreciated that data 200 may be stored in various data structures, memories, media, and/or in one or more locations.

Figure 3:
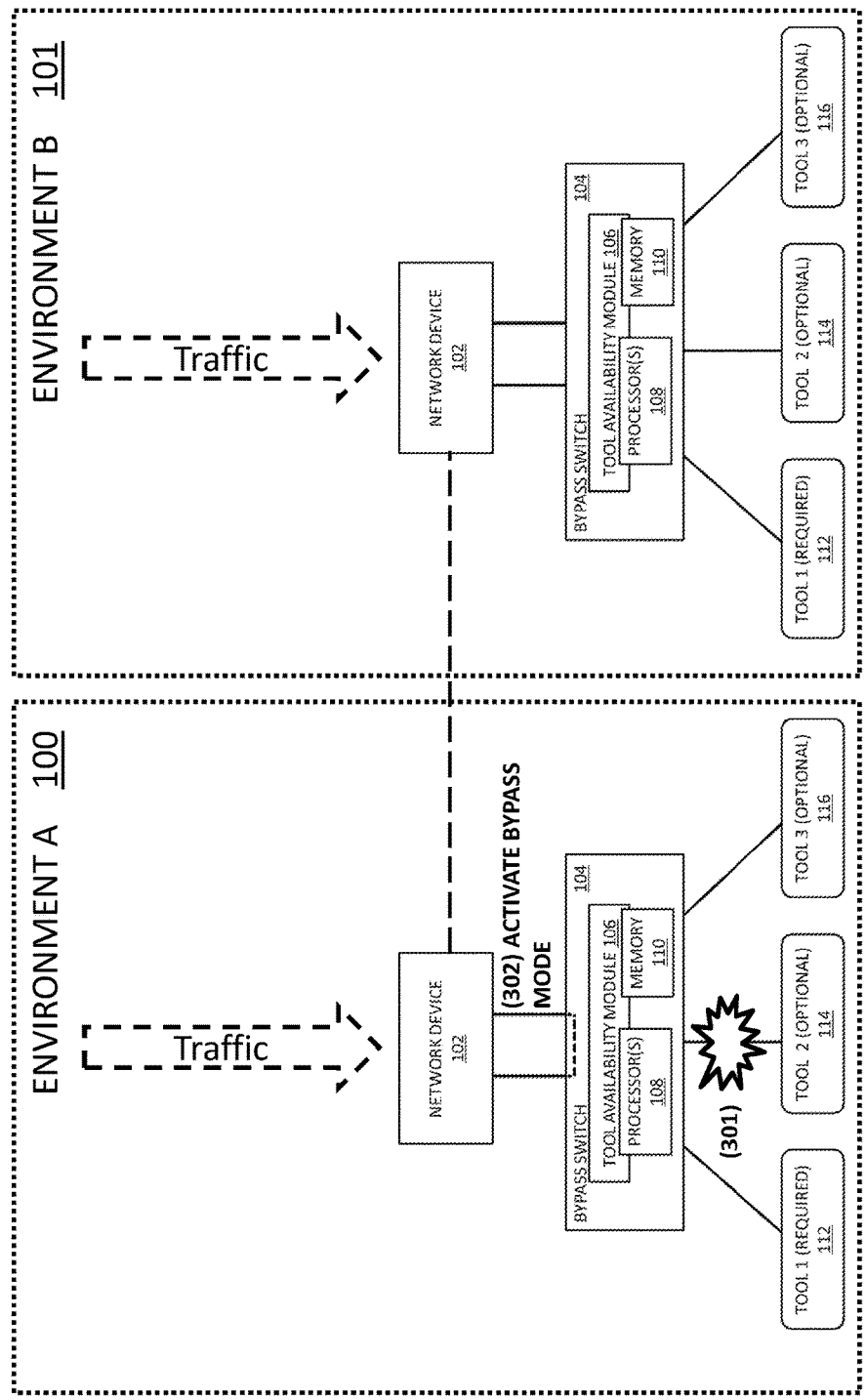
FIG. 3 is a diagram illustrating an example bypass mode at a bypass switch.

FIG. 3 is a diagram illustrating an example bypass mode at bypass switch 104. In some embodiments, environments 100 and 101 may be configured for an active-active environment or configuration, e.g., where each environment represents an active network, network segment, or environment involving entities for monitoring, analyzing, and/or processing a portion of network traffic.

In some embodiments, bypass switch 104 and/or TAM 106 may periodically or aperiodically (e.g., dynamically) send heartbeat request messages to tools 112-116 via communications ports associated with bypass switch 104. If heartbeat response messages are not received or detected by bypass switch 104 and/or TAM 106 within a particular amount of time, bypass switch 104 and/or TAM 106 may determine that a tool is unavailable and may initiate or trigger various actions for supporting high availability at bypass switch 104.

Referring to FIG. 3, in step 301, it may be determined or detected that a link or a related port connecting bypass switch 104 and tool 114 is experiencing issues. For example, tool 114 may be determined to be unavailable or unreachable after bypass switch 104 fails to receive any communications (e.g., heartbeat response messages) from tool 114 within the past 5 seconds.

In some embodiments, e.g., after determining that a tool is unavailable, bypass switch 104 and/or TAM 106 may access a data structure for determining whether the tool is required or optional and/or for determining appropriate actions to perform or initiate. For example, bypass switch 104 and/or TAM 106 may query a data structure in memory 110 using a tool ID for determining how bypass switch 104 should respond, e.g., activating a bypass mode or disabling links or ports associated with bypass switch 104.

In some embodiments, e.g., after determining that a tool is unavailable, bypass switch 104 and/or TAM 106 may bring online and/or activate backup tools, if available. For example, assuming tool 114 has a local backup tool connected to bypass switch 104 via another port, bypass switch 104 and/or TAM 106 may attempt to utilize the local backup tool prior to or in lieu of performing additional actions, e.g., activating a bypass mode or disabling links or ports associated with bypass switch 104.

In step 302, after determining that tool 114 is optional, bypass switch 104 or TAM 106 may activate a bypass mode at bypass switch 104. For example, activating a bypass mode at bypass switch 104 may involve shunting network traffic away from or around tool 114 or a related port. In this example, bypass switch 104 may send receive network traffic from network device 102 via an ingress port and send the network traffic back to network device 102 via an egress port without sending it towards tool 114. In another example, activating a bypass mode at bypass switch 104 may involve avoiding sending network traffic to tool 114 or a related port, while sending network traffic to available tools 112 and 116.

In some embodiments, after activating a bypass mode at bypass switch 104, bypass switch 104 may stay in the bypass mode until tool 114 becomes available again. For example, after tool 114 becomes available, bypass switch 104 or TAM 106 in environment 100 may deactivate the bypass mode and activate a normal or non-bypass mode. In this example, in the normal mode, bypass switch 104 may receive network traffic and send the network traffic to tools 112-116.

It will be appreciated that FIG. 3 is for illustrative purposes and that different and/or additional messages and/or actions may be used. It will also be appreciated that various messages and/or actions described herein may occur in a different order or sequence.

Figure 4:
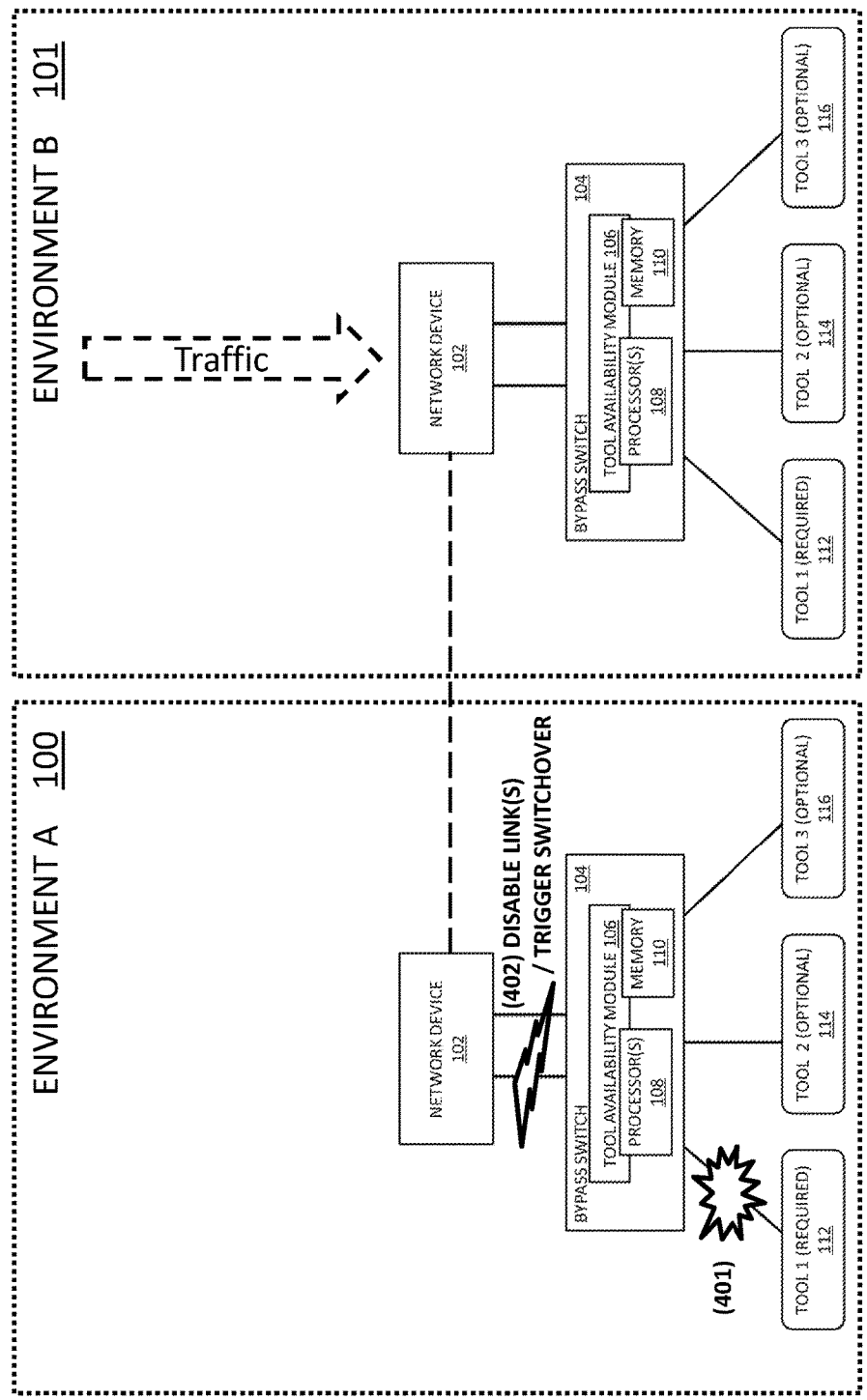
FIG. 4 is a diagram illustrating disabling links associated with a bypass switch.

FIG. 4 is a diagram illustrating disabling links associated with a bypass switch 104. In some embodiments, environments 100 and 101 may be configured for an active-active environment or configuration, e.g., where each environment represents an active network, network segment, or environment involving entities for monitoring, analyzing, and/or processing a portion of network traffic.

In some embodiments, bypass switch 104 and/or TAM 106 may periodically or aperiodically (e.g., dynamically) send heartbeat request messages to tools 112-116 via communications ports associated with bypass switch 104. If heartbeat response messages are not received or detected by bypass switch 104 and/or TAM 106 within a particular amount of time, bypass switch 104 and/or TAM 106 may determine that a tool is unavailable and may initiate or trigger various actions for supporting high availability at bypass switch 104.

Referring to FIG. 4, in step 401, it may be determined or detected that a link or a related port connecting bypass switch 104 and tool 112 is experiencing issues. For example, tool 112 may be determined to be unavailable or unreachable after bypass switch 104 fails to receive any communications (e.g., heartbeat response messages) from tool 112 within the past 5 seconds.

In some embodiments, e.g., after determining that a tool is unavailable, bypass switch 104 and/or TAM 106 may access a data structure for determining whether the tool is required or optional and/or for determining appropriate actions to perform or initiate. For example, bypass switch 104 and/or TAM 106 may query a data structure in memory 110 using a tool ID for determining how bypass switch 104 should respond, e.g., activating a bypass mode or disabling links or ports associated with bypass switch 104.

In some embodiments, e.g., after determining that a tool is unavailable, bypass switch 104 and/or TAM 106 may bring online and/or activate backup tools, if available. For example, assuming tool 112 has a local backup tool connected to bypass switch 104 via another port, bypass switch 104 and/or TAM 106 may attempt to utilize the local backup tool prior to or in lieu of performing additional actions, e.g., activating a bypass mode or disabling links or ports associated with bypass switch 104.

In step 402, after determining that tool 112 is required, bypass switch 104 or TAM 106 may trigger a switchover and/or disable one or more links or related ports associated with bypass switch 104. For example, disabling one or more links or related ports associated with bypass switch 104 may involve disabling one or more ingress and/or egress links or ports connecting bypass switch 104 and network device 102.

In some embodiments, disabling one or more links or related ports associated with bypass switch 104 may trigger a switchover. For example, network device 102 or another entity (e.g., a checkpoint or switchover management system) may determine when bypass switch 104 is unavailable, unreachable, or experiencing issues and, in response, may initiate a switchover such that bypass switch 104 in environment 101 receives network traffic that previously would have been received by bypass switch 104 in environment 100. In this example, bypass switch 104 in environment 101 may send the network traffic to tool 112 in environment 101 which has similar functionality to unavailable tool 112 in environment 100.

In some embodiments, triggering a switchover may involve one environment becoming inactive and/or another environment becoming active. For example, assuming an initial active-active configuration where both environments 100 and 101 are active, a switchover may involve environment 100 or entities therein becoming inactive. In another example, assuming an initial active-standby configuration where environment 100 is active and environment 101 is inactive or in standby, a switchover may involve environment 101 or entities therein becoming active and environment 100 or entities therein becoming inactive.

In some embodiments, after triggering a switchover, environment 100 may stay inactive until tool 112 becomes available again. For example, after tool 112 becomes available, bypass switch 104 or TAM 106 in environment 100 may enable any disabled links or ports and/or perform other action that may trigger environment 100 to become active. In this example, after environment 100 becomes active, bypass switch 104 in environment 100 may receive network traffic and send the network traffic to tool 112 and/or other tools in environment 100.

It will be appreciated that FIG. 4 is for illustrative purposes and that different and/or additional messages and/or actions may be used. It will also be appreciated that various messages and/or actions described herein may occur in a different order or sequence.

Figure 5:
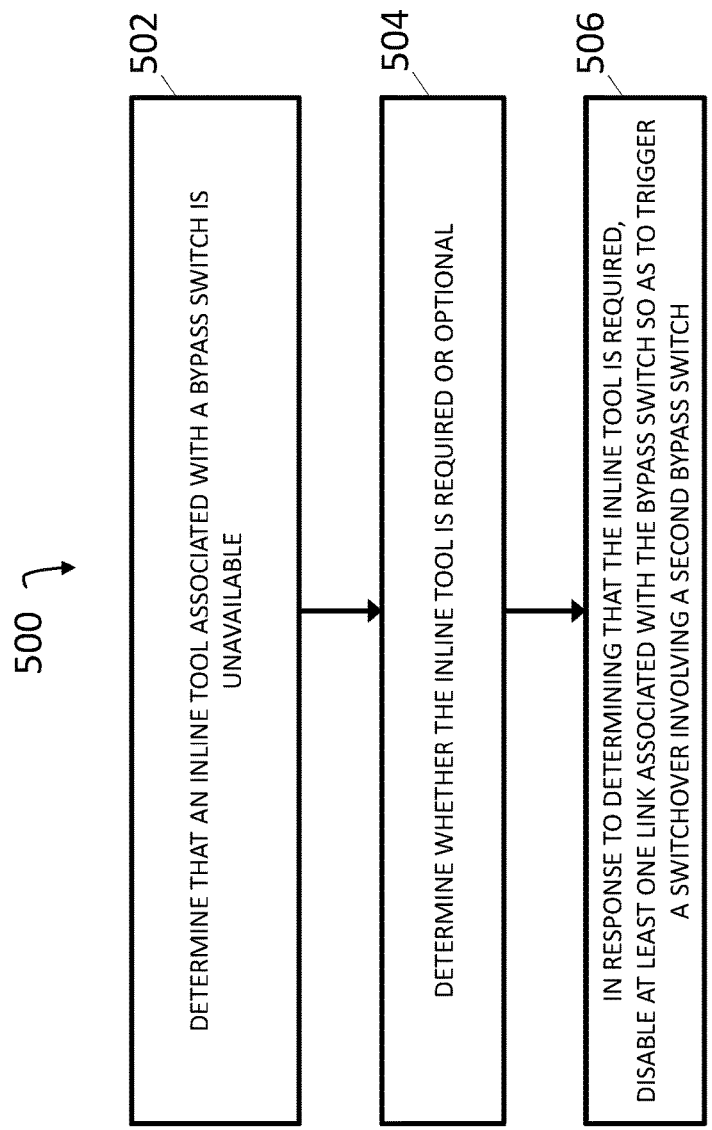
FIG. 5 is a flow diagram of a method for providing high availability support at a bypass switch.

FIG. 5 is a flow diagram of an example method 500 for providing high availability support at bypass switch 104. In some embodiments, method 500, or portions thereof, may be performed by or at bypass switch 104, TAM 106, and/or another node or module. For example, bypass switch 104 and/or TAM 106 may include computing hardware (e.g., processor(s) 108, an ASIC, and/or an FPGA) and/or memory 110 (e.g., random-access memory (RAM)).

In step 502, it may be determined that an inline tool associated with a bypass switch is unavailable. For example, bypass switch 104 and/or TAM 106 may monitor communications received from tool 112 via one or more communications ports. In this example, if no communications are received from tool 112 within a particular time period (e.g., 5 seconds after a request message is sent to a tool), bypass switch 104 or TAM 106 may determine that tool 112 is unavailable (e.g., offline, congested, and/or experiencing connection issues).

In step 504, it may be determined whether the inline tool is required or optional. For example, determining whether an inline tool is required or optional may include querying a data structure associated with bypass switch 104. For example, memory 110 may include a data structure that contains tool related information (e.g., data 200) indicating whether the inline tool is required or optional.

In step 506, in response to determining that the inline tool is required, at least one link associated with the bypass switch may be disabled so as to trigger a switchover involving a second bypass switch. For example, at least one link that may be disabled may include an egress link or an ingress link between network device 102 and bypass switch 104.

In some embodiments, a network device may trigger a switchover after determining that at least one link associated with bypass switch 104 is nonoperational or disabled. For example, in environment 100, after tool 112 becomes unavailable, bypass switch 104 may disable links connecting network device 102 and bypass switch 104. In this example, network device 102 or another device may monitor these links or related ports and, in response to determining that these links or related ports are nonoperational or disabled, may trigger a switchover such that network traffic is handled by bypass switch 104 in environment 101.

In some embodiments, after a switchover, a second bypass switch may receive and send network traffic to at least one inline tool. For example, bypass switch 104 in environment 101 may handle network traffic that previously would be handled by bypass switch 104 in environment 100.

In some embodiments, in response to determining that an inline tool is optional, a bypass mode at the bypass switch may be activated such that network traffic traversing the bypass switch is sent back to the network without being sent to the inline tool. For example, bypass switch 104 may avoid or bypass an unavailable tool, e.g., by sending network traffic directly from an ingress network port at bypass switch 104 to an egress network port at bypass switch 104.

In some embodiments, activating a bypass mode may include sending network traffic to another inline tool that is available. For example, bypass switch 104 may send (e.g., via another port) network traffic to a local backup tool that comes online when tool 112 becomes unavailable. In another example, bypass switch 104 may send network traffic to other available tools, such as tools 114-116, but may bypass sending network traffic to any unavailable tools, such as tool 112.

In some embodiments, an inline tool may include a metering device, a monitoring device, a billing system, a security device, an IPS device, a firewall, a WAN optimization device, or a unified threat management system. For example, tool 112 may include a metering device for maintaining usage statistics, tool 114 may include IPS device for detecting network attacks, and tool 116 may include a firewall or other device for authorizing communications between various devices or networks.

It should be noted that bypass switch 104, TAM 106, and/or functionality described herein may constitute a special purpose computing device. Further, bypass switch 104, TAM 106, and/or functionality described herein can improve the technological field of bypass switches and related availability of inline tools. Furthermore, bypass switch 104, TAM 106, and/or functionality described herein can utilize or include one or more improvements to computer-related technology and/or computer functionality. For example, by performing different actions (e.g., activating a bypass mode or disabling links for triggering a switchover) when an inline tool becomes unavailable depending on the optionality of the tool, bypass switch 104 may monitor and/or control network traffic more efficiently and/or with higher availability to connected tools than approaches where a bypass switch only activates a bypass mode when any inline tool becomes unavailable.

Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for providing high availability support at a first bypass switch, the method comprising:
 at the first bypass switch:
  connecting between a network device separate from the first bypass switch and a plurality of inline network monitoring or security tools that receive and process traffic from the network device that is forwarded to the inline network monitoring or security tools through the first bypass switch, wherein receiving and processing the traffic includes inspecting the traffic for network monitoring or security purposes;
  determining, by the first bypass switch, that a first inline network monitoring or security tool of the inline network monitoring or security tools connected to the first bypass switch is unavailable;
  determining, by the first bypass switch, that the first inline network monitoring or security tool connected to the first bypass switch is required, and, in response to determining that the first inline network monitoring or security tool is unavailable and required, disabling at least one link connecting the first bypass switch to the network device, wherein the disabling of the at least one link triggers the network device to switch over to a second bypass switch connected to a second inline network monitoring or security tool that provides the same service as the first inline network monitoring or security tool and to forward traffic to the second inline network monitoring or security tool providing the same service as the first inline network monitoring or security tool through the second bypass switch; and
  determining that a third inline network monitoring or security tool of the inline network monitoring or security tools connected to the first bypass switch is unavailable and optional, and, in response to determining that the third inline network monitoring or security tool is unavailable and optional, activating a bypass mode at the first bypass switch, wherein activating the bypass mode includes sending the network traffic destined for the third inline network monitoring or security tool to a fourth inline network monitoring or security tool of the inline network monitoring or security tools connected to the first bypass switch that is available and that provides the same service as the third inline network monitoring or security tool and such that network traffic traversing the first bypass switch and destined for the third inline network monitoring or security tool is sent back to the network without being sent to the third inline network monitoring or security tool.

2. The method of claim 1 wherein determining that the first inline network monitoring or security tool connected to the first bypass switch is unavailable includes determining that no communications from the inline network monitoring or security tool are received at the first bypass switch within a particular amount of time.

3. The method of claim 1 wherein determining that the first inline network monitoring or security tool is required includes querying a data structure associated with the first bypass switch, wherein the data structure includes tool related information indicating that the first inline network monitoring or security tool is required.

4. The method of claim 1 wherein the at least one link includes an egress link or an ingress link between the network device and the first bypass switch.

5. The method of claim 1 wherein the first inline network monitoring or security tool includes a metering device, a monitoring device, a billing system, a security device, an intrusion prevention system (IPS) device, a firewall, a wireless area network (WAN) optimization device, or a unified threat management system.

6. A system for providing high availability support at a first bypass switch, the system comprising:
 the first bypass switch including:
  a plurality of ports for connecting the first bypass switch between a network device separate from the first bypass switch and a plurality of inline network monitoring or security tools that receive and process traffic from the network device that is forwarded to the inline network monitoring or security tools through the first bypass switch, wherein receiving and processing the traffic includes inspecting the traffic for network monitoring or security purposes;
  a memory;
  a computing processor; and
  a tool availability module (TAM) implemented using the computing processor and the memory, wherein the TAM is for providing high availability support at the first bypass switch, wherein providing high availability support at the first bypass switch includes:
  determining, by the first bypass switch, that a first inline network monitoring or security tool of the inline network monitoring or security tools connected to the first bypass switch is unavailable; and
  determining, by the first bypass switch, that the first inline network monitoring or security tool is required, and, in response to determining that the first inline network monitoring or security tool is unavailable and required, disabling at least one link connecting the first bypass switch to the network device, wherein the disabling of the at least one link triggers the network device to switch over to a second bypass switch connected to a second inline network monitoring or security tool that provides the same service as the first inline network monitoring or security tool and to forward traffic to the second inline network monitoring or security tool providing the same service as the first inline network monitoring or security tool through the second bypass switch, wherein the TAM is configured to activate, in response to determining that a third inline network monitoring or security tool of the inline network monitoring or security tools connected to the first bypass switch is unavailable and optional, a bypass mode at the first bypass switch such that network traffic traversing the first bypass switch and destined for the third inline network monitoring or security tool is sent to a fourth inline network monitoring or security tool connected to the first bypass switch that is available and that provides the same service as the third inline network monitoring or security tool and such that the network traffic traversing the first bypass switch is sent back to the network without being sent to the third inline network monitoring or security tool.

7. The system of claim 6 wherein the TAM is configured to determine that the first inline network monitoring or security tool connected to the first bypass switch is unavailable by determining that no communications from the first inline network monitoring or security tool are received by the first bypass switch within a particular amount of time.

8. The system of claim 6 wherein the TAM is configured to query a data structure associated with the first bypass switch, wherein the data structure includes tool related information indicating that the first inline network monitoring or security tool is required.

9. The system of claim 6 wherein the at least one link includes an egress link or an ingress link between the network device and the first bypass switch.

10. The system of claim 6 wherein the inline network monitoring or security tool includes a metering device, a monitoring device, a billing system, a security device, an intrusion prevention system (IPS) device, a firewall, a wireless area network (WAN) optimization device, or a unified threat management system.

11. A non-transitory computer readable medium comprising computer executable instructions embodied in the non-transitory computer readable medium that when executed by at least one processor of a computer perform steps comprising:

connecting a first bypass switch between a network device separate from the first bypass switch and a plurality of inline network monitoring or security tools that receive and process traffic from the network device that is forwarded to the inline network monitoring or security tools through the first bypass switch, wherein receiving and processing the traffic includes inspecting the traffic for network monitoring or security purposes;

determining, by the first bypass switch, that a first inline network monitoring or security tool of the inline network monitoring or security tools connected to the first bypass switch is unavailable;

determining, by the first bypass switch, that the first inline network monitoring or security tool connected to the first bypass switch is required, and, in response to determining that the first inline network monitoring or security tool is unavailable and required, disabling at least one link connecting the first bypass switch to the network device, wherein the disabling of the at least one link triggers the network device to switch over to a second bypass switch connected to a second inline network monitoring or security tool that provides the same service as the first inline monitoring or security tool and to forward traffic to the second inline network monitoring or security tool that provides the same service as the first inline network monitoring or security tool through the second bypass switch; and determining that a third inline network monitoring or security tool of the inline network monitoring or security tools connected to the first bypass switch is unavailable and optional, and, in response to determining that the third inline network monitoring or security tool is unavailable and optional, activating a bypass mode at the first bypass switch, wherein activating the bypass mode includes sending the network traffic destined for the third inline network monitoring or security tool to a fourth inline network monitoring or security tool of the inline network monitoring or security tools connected to the first bypass switch that is available and that provides the same service as the third inline network monitoring or security tool and such that network traffic traversing the first bypass switch and destined for the third inline network monitoring or security tool is sent back to the network without being sent to the third inline network monitoring or security tool.

* * * * *